(12) United States Patent
Hiraike

(10) Patent No.: US 9,411,401 B2
(45) Date of Patent: Aug. 9, 2016

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Kou Hiraike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 13/957,093

(22) Filed: Aug. 1, 2013

(65) Prior Publication Data
US 2014/0040645 A1 Feb. 6, 2014

(30) Foreign Application Priority Data

Aug. 6, 2012 (JP) ................................. 2012-173723

(51) Int. Cl.
*G06F 1/32* (2006.01)
*G06F 1/26* (2006.01)
(52) U.S. Cl.
CPC ............ *G06F 1/3234* (2013.01); *G06F 1/3284* (2013.01); *G06F 1/3287* (2013.01); *G06F 1/26* (2013.01); *Y02B 60/1267* (2013.01); *Y02B 60/1282* (2013.01)
(58) Field of Classification Search
CPC ..................................... G06F 9/26; G06F 9/32
See application file for complete search history.

(56) References Cited

U.S. PATENT DOCUMENTS

| 8,032,773 B2 * | 10/2011 | Kim ............................... 713/323 |
| 2002/0138669 A1 * | 9/2002 | Kadatch et al. .................... 710/5 |
| 2006/0059380 A1 * | 3/2006 | Kimura .......................... 713/323 |
| 2007/0149256 A1 * | 6/2007 | Burgan et al. ................. 455/574 |
| 2012/0042185 A1 * | 2/2012 | Lee et al. ....................... 713/323 |
| 2014/0113689 A1 * | 4/2014 | Lee ............................... 455/573 |

FOREIGN PATENT DOCUMENTS

| JP | 9-34578 A | 2/1997 |
| JP | 2000-82014 A | 3/2000 |
| JP | 2006-229509 A | 8/2006 |

* cited by examiner

*Primary Examiner* — Phil Nguyen
(74) *Attorney, Agent, or Firm* — Canon U.S.A., Inc. IP Division

(57) ABSTRACT

An information processing apparatus capable of executing power ON processing for activating a program for storing information in a volatile memory or power OFF processing for stopping the program according to start or stop of power supply includes a communication unit configured to communicate with an external apparatus, a transfer unit configured to transfer a first mode for supplying power to a volatile memory and the communication unit to a second mode for supplying power to the volatile memory while not supplying power to the communication unit according to a data processing state, and a control unit configured to cause a first program to execute power saving processing for saving information stored in the volatile memory to a non-volatile memory and to cause a second program to execute the power OFF processing and the power ON processing when the mode is transferred from the first mode to the second mode.

11 Claims, 7 Drawing Sheets

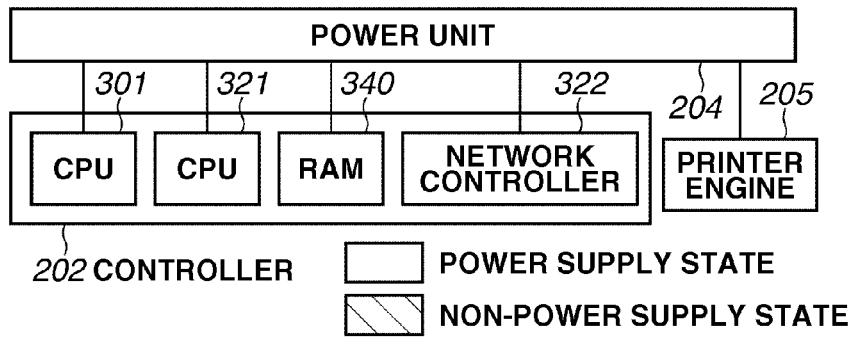
FIG.3A POWER ON STATE
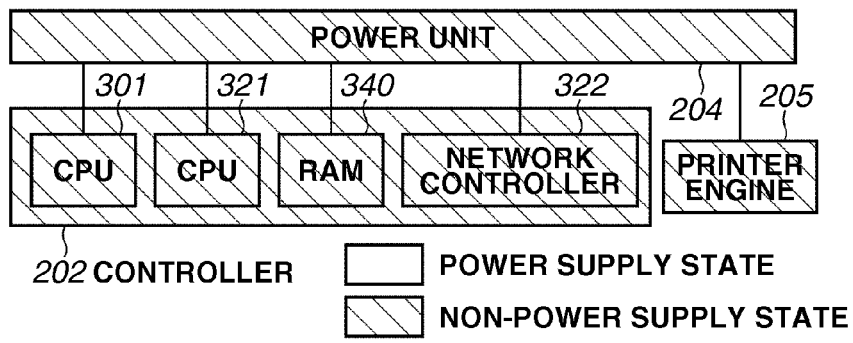
FIG.3B POWER OFF STATE
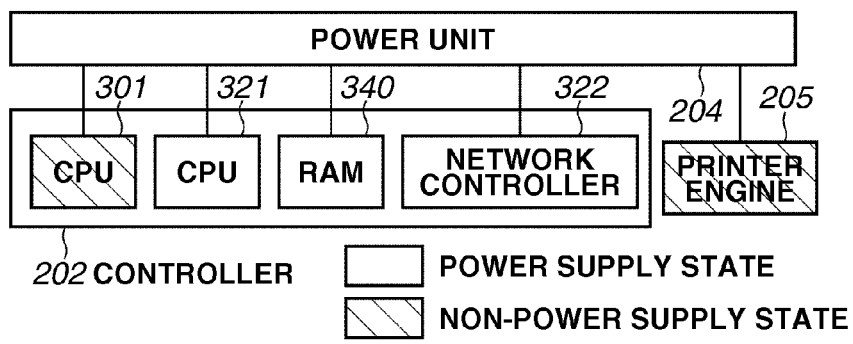
FIG.3C POWER SAVING STATE
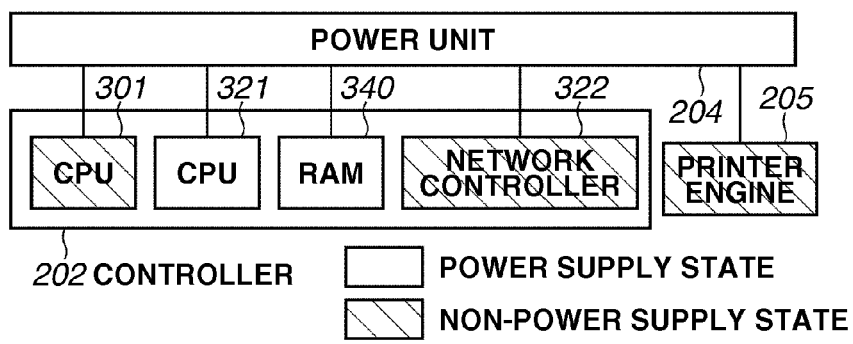
FIG.3D HIGH SPEED ACTIVATION STAND-BY STATE

FIG.4A POWER ON
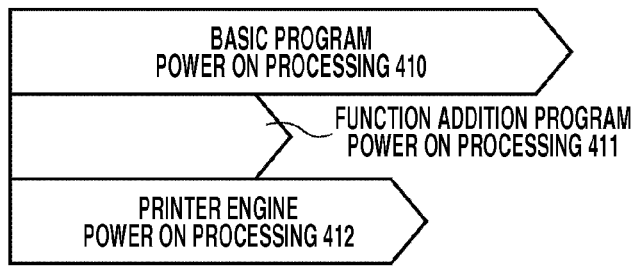
FIG.4B POWER OFF
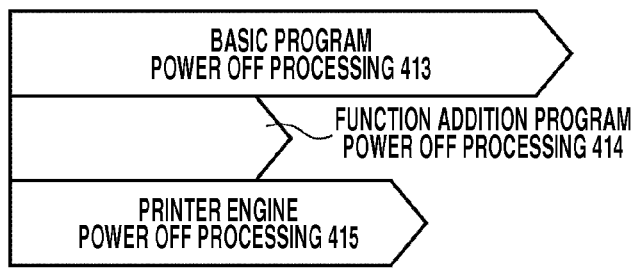
FIG.4C HIGH SPEED ACTIVATION STAND-BY
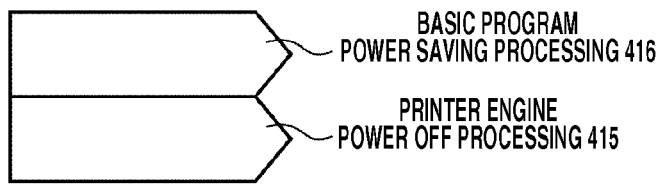
FIG.4D HIGH SPEED ACTIVATION RETURN
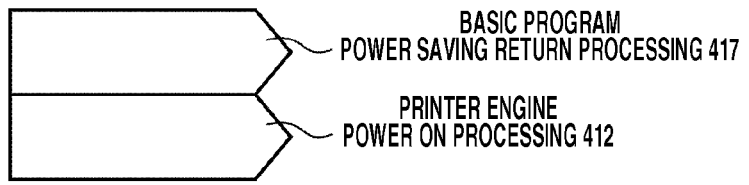
FIG.4E HIGH SPEED ACTIVATION STAND-BY
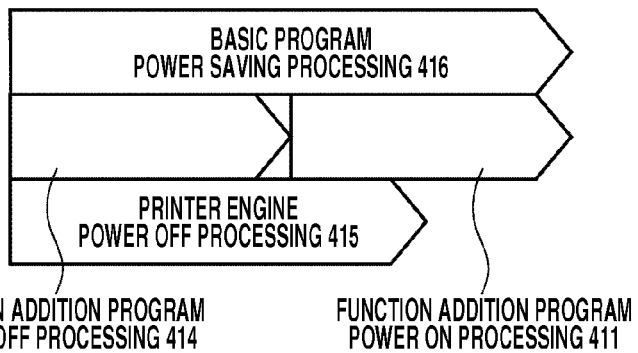

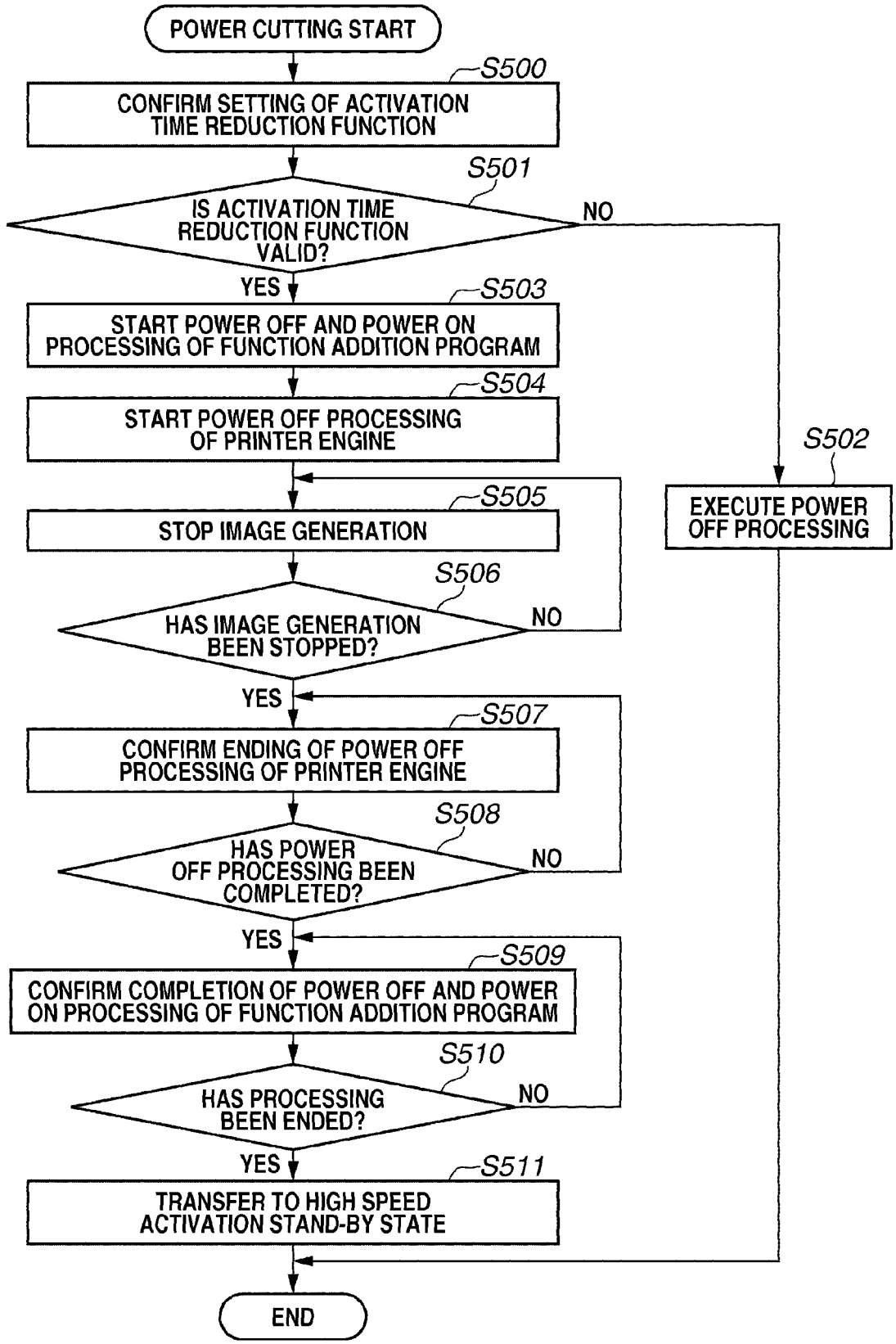

HIGH SPEED ACTIVATION STAND-BY

HIGH SPEED ACTIVATION RETURN

INFORMATION PROCESSING APPARATUS, CONTROL METHOD FOR INFORMATION PROCESSING APPARATUS, AND STORAGE MEDIUM

BACKGROUND

1. Field

Aspects of the present invention generally relate to an information processing apparatus executing applications in different power saving control, a control method for the information processing apparatus, and a storage medium.

2. Description of the Related Art

In recent years, an information processing apparatus such as an image forming apparatus has been becoming to require longer activation time. One of the factors in the above situation is that the size of data to be loaded into a random access memory (RAM) from a read only memory (ROM) at the activation time is increased due to multi-functionalization of the image forming apparatus.

To improve above problem, there are techniques for reducing the time required for activation. In the techniques, data in the RAM is held as it is when a user turns off a power switch, so as to omit loading of the data from the ROM to the RAM when the user turns on the power switch next time.

As one of the above-described techniques, there is provided a technique known as "suspend" which holds data in the RAM by continuously supplying power to the RAM (see Japanese Patent Application Laid-Open No. 9-34578).

Further, as one of the above-described techniques, there is also provided a technique known as "hibernation" which holds data in the RAM by temporarily saving the data in the RAM to a hard disk drive (HDD) (see Japanese Patent Application Laid-Open No. 2000-82014).

With the above-described techniques, while the power of the apparatus appears to be completely turned off to the user, the time required for activation can be reduced.

Furthermore, while taking advantage of the above state where the power thereof appears to be turned off, there is also provided a technique which realizes a long-term stable operation by automatically executing periodic rebooting to refresh the system (see Japanese Patent Application Laid-Open No. 2006-229509).

In an image forming apparatus having a function for adding a program, if the data in the RAM is not to be temporarily saved to a non-volatile memory, mismatch arises in the data in the RAM and the data in the non-volatile memory to cause an incorrect operation when a power code is unplugged or an power supply is cut off. Therefore, by temporarily saving to the non-volatile memory the data stored in the RAM, the program to be added needs to be capable of being recovered when the power supply is stopped.

However, in order to temporarily save to the non-volatile memory the data stored in the RAM, a program for that purpose has to be created, and thus a programming load will be increased.

SUMMARY

An aspect of the present invention is generally directed to an information processing apparatus capable of executing power ON processing for activating a program for storing information in a volatile memory or power OFF processing for stopping the program according to start or stop of power supply, the information processing apparatus including a communication unit configured to communicate with an external apparatus, a transfer unit configured to transfer a first mode for supplying power to a volatile memory and the communication unit to a second mode for supplying power to the volatile memory while not supplying power to the communication unit according to a data processing state, and a control unit configured to, when the mode is transferred from the first mode to the second mode, cause a first program to execute power saving processing for saving information stored in the volatile memory to a non-volatile memory and to cause a second program to execute the power OFF processing and the power ON processing.

Further features of the present disclosure will become apparent from the following description of exemplary embodiments with reference to the attached drawings.

BRIEF DESCRIPTION OF THE DRAWINGS

FIGS. 3A through 3D are diagrams illustrating power supply states (power modes) of the image forming apparatus.

FIGS. 4A through 4E are diagrams illustrating transition of processing time of the image forming apparatus according to an exemplary embodiment.

FIG. 5 is a flowchart illustrating a control method of the image forming apparatus.

DESCRIPTION OF THE EMBODIMENTS

An exemplary embodiment will be described with reference to the drawings. In the following description, a printer will be described as an example of an image forming apparatus. However, the image forming apparatus may be any other apparatus such as a multifunction peripheral.

<Description of System Configuration>
<Configuration of Apparatus>

First, a configuration of an apparatus according to the present exemplary embodiment will be described with reference to FIGS. 1 through 3D.

Figure 1:
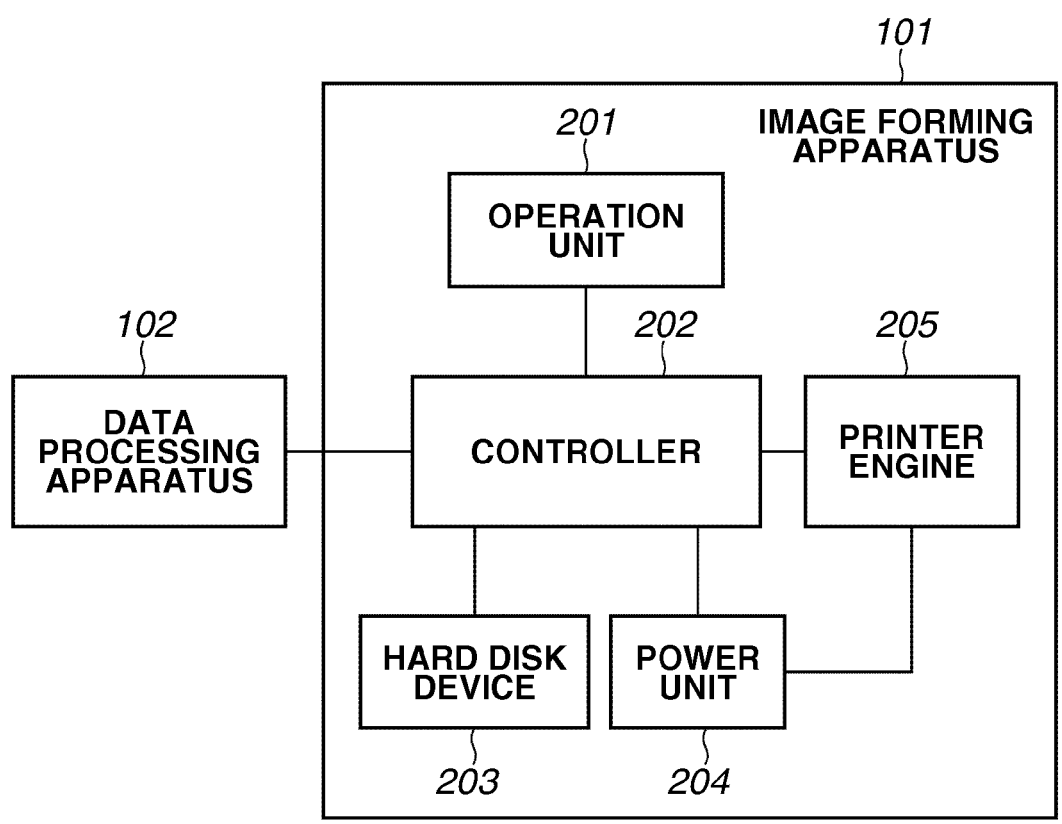
FIG. 1 is a block diagram illustrating a configuration of an image forming apparatus according to an exemplary embodiment.

FIG. 1 is a block diagram illustrating a configuration of an information processing apparatus according to the present exemplary embodiment. In the present exemplary embodiment, an image forming apparatus is taken as an example of the information processing apparatus. However, additional embodiments are applicable to devices and systems executing below-described power control. More specifically, the devices and the systems include a printing apparatus, a facsimile machine, a copying apparatus, and a multi-function image processing apparatus provided with a volatile memory and a non-volatile memory, capable of executing below-described power saving control.

Further, the information processing apparatus illustrated in the present exemplary embodiment includes a function for adding or deleting a function that can be used by a user by installing or uninstalling an application or a license. For example, a Multi-functional Embedded Application Platform (MEAP)® capable of dynamically adding or deleting an embedded application is made into a product by Canon Inc. by embedding an execution environment of Java® into a multifunction peripheral. More specifically, for example, there is provided a sophisticated multifunction peripheral provided with an application platform such as the MEAP®. In the MEAP®, a MEAP® application is developed, and installed and operated in the multifunction peripheral to realize various kinds of work flows using the multifunction peripheral. In the present exemplary embodiment, the MEAP® application for adding a function will be described as a second example of the program.

In FIG. 1, a data processing apparatus 102 such as a computer, for example, issues a print job and provides an instruction for a device to an image forming apparatus 101 via a communication interface such as a local area network (LAN). The image forming apparatus 101 includes the following configuration.

A controller 202 generally controls the image forming apparatus 101 by providing instructions to respective modules. The modules include a basic module (first module) for controlling each functional processing, and a function addition module (second module) for adding each functional processing. Hereinbelow, difference in processing between the first module and the second module will be described.

As described above, the control for transferring a power state to various power states as illustrated in FIG. 3 is executed on the information processing apparatus according to the present exemplary embodiment. Further, the control for transferring a low-power state for high speed activation to a pseudo-power off state (quick-off state) is also executed. Although the quick-off state is a sleep state with the lowest power, the control for causing the quick-off state to transfer to a stand-by state by receiving a job processing request from the network is not executed thereon.

A printer engine 205 outputs a digital image on a sheet of paper according to image information provided by the controller 202. An operation of the image forming apparatus 101 is executed through an operation unit 201.

The operation unit 201 includes operation buttons for a user to execute settings of the image forming apparatus 101, and a display panel as a display unit such as a liquid crystal screen for providing various kinds of information of the image forming apparatus 101 to the user. A hard disk device 203, which may be any other storage device, stores a digital image and resource information used for generating the digital image. A power unit 204 is connected to an alternate-current (AC) power source to supply power to respective units of the image forming apparatus 101.

The image forming apparatus 101 exemplified in the present exemplary embodiment is not limited to a printer, and may be a digital multifunction peripheral having an image forming function.

Figure 2:
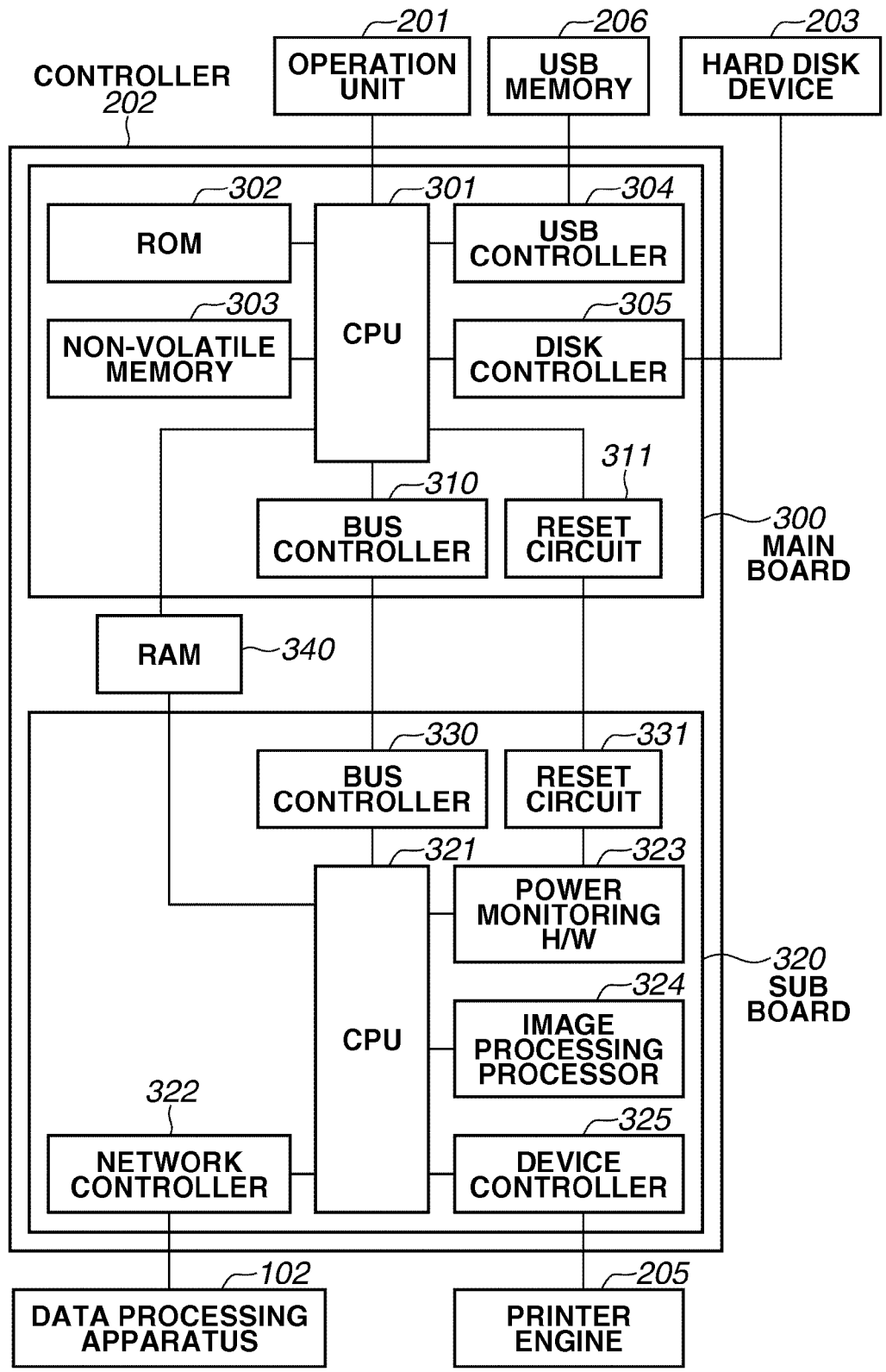
FIG. 2 is a block diagram illustrating a configuration of a controller of the image forming apparatus.

FIG. 2 is a block diagram illustrating a configuration of the controller 202 of the image forming apparatus 101 according to the present exemplary embodiment. Although a CPU 301 and a CPU 321 include various kinds of CPU peripheral hardware such as a chipset, a bus bridge, and a clock generator, the block diagram in FIG. 2 is illustrated in a simplified manner.

In FIG. 2, the controller 202 includes a main board 300 and a sub board 320. The main board 300 is a general-purpose CPU system including the following configuration.

The CPU 301 controls the entire main board 300. A ROM 302 stores programs for the CPU 301 and the CPU 321.

A non-volatile memory 303 stores setting information of the image forming apparatus 101 and counter information relating to printing, and holds the information thereof even in a case where the power is cut off. A universal serial bus (USB) controller 304 controls an input and an output of data with respect to a USB memory 206. The USB memory 206 stores various kinds of data used in the image forming apparatus 101.

A disk controller 305 controls an input/output with respect to the hard disk device 203. A bus controller 310 includes a bridge function with a bus controller 330 of the sub board 320.

A reset circuit 331 resets hardware (H/W) setting of the main board 300. The sub board 320 is configured of a comparatively small-size general-purpose CPU system and image processing hardware, and includes the following configuration. The CPU 321 controls the entire sub board 320. A network controller 322 receives and outputs data from/to the external data processing apparatus 102 via the LAN.

A power monitoring H/W 323 monitors power control of the system. In a case where the CPU 321 can operate normally, the system can be reset via the reset circuit 331 and a reset circuit 311 according to an instruction from the CPU 321.

Further, when power is not supplied to the CPU 321, power of the controller 202 can be supplied according to an input through a power switch (not illustrated). In a case where an application specific integrated circuit (ASIC) is employed, the CPU system may be small in size. The reset circuit 331 resets H/W setting of the sub board 320. An image processing processor 324 executes real time digital image processing. A device controller 325 controls the printer engine 205.

The bus controller 330 includes a bridge function with the bus controller 310 of the main board 300. In addition to the above-described configuration, the controller 202 includes a RAM 340.

The RAM 340 is accessible from both the CPU 301 and the CPU 321, and used as a main memory for the CPU 301 and the CPU 321.

According to an initial program of the ROM 302, the CPU 301 reads out main programs for the CPU 301 and the CPU 321 from the ROM 302 to store the main programs in the RAM 340.

FIG. 3 is a diagram illustrating power supply states (power modes) of the image forming apparatus 101 according to the present exemplary embodiment. In the following description, a state of stopping the power supply includes a state of supplying a small amount of power to an extent that a supply destination of the power does not operate normally, in addition to a state where the power supply amount becomes zero.

FIG. 3A illustrates a power ON state as an example of a first power mode. In this state, power is supplied to respective configurations of the image forming apparatus 101. If a predetermined time has passed without executing any function in the power ON state, the power mode is transferred to a power saving state in FIG. 3C.

Further, if a power OFF operation is executed by pressing a power button in the power ON state, the power mode is transferred to a power OFF state in FIG. 3B under a predetermined condition.

A long-press operation of the power button in which the power button is pressed for a predetermined time or longer may be included in the condition for transferring the power mode to the power OFF state in FIG. 3B. Further, if the power OFF operation is executed by pressing the power button in the power ON state, the power mode is transferred to a high speed activation stand-by state in FIG. 3D under a predetermined condition.

FIG. 3B illustrates the power OFF state in which power supply for respective configurations of the image forming apparatus 101 is stopped. If the power ON operation is executed by pressing the power button in the power OFF state, the power mode is transferred to the power ON state in FIG. 3A.

At this time, because the main programs of the CPU 301 and the CPU 321 are read out from the ROM 302 to be loaded into the RAM 340, the time taken to complete activation is longer than the time taken to complete activation from the high speed activation stand-by state in FIG. 3D.

FIG. 3C illustrates a power saving state in which power supply for the CPU 321, the RAM 340, the network controller 322, and the power unit 204 is maintained while power supply for other configurations is stopped.

In the power saving state, if data is input to the network controller 322, or a power saving cancel button of the operation unit 201 is pressed by the user, the power mode is transferred to the power ON state in FIG. 3A.

Further, if the power OFF operation is executed by pressing the power button in the power saving state, the power mode is transferred to the power OFF state in FIG. 3B under a predetermined condition.

The long-press operation of the power button in which the power button is pressed for a predetermined time or longer may be included in the condition for transferring the power mode to the power OFF state in FIG. 3B.

Further, if the power OFF operation is executed by pressing the power button in the power saving state, the power mode is transferred to the high speed activation stand-by state in FIG. 3D under a predetermined condition.

FIG. 3D is a diagram illustrating the high speed activation stand-by state. The high speed activation stand-by state is an example of a second power mode. In this state, power supply for the CPU 321 and the RAM 340 is maintained while power supply for other configurations is stopped. If the power ON operation is executed by pressing the power button in the high speed activation stand-by state, the power mode is transferred to the power ON state in FIG. 3A.

At this time, because the CPU 301 uses the main program already loaded in the RAM 340, the time taken to complete activation is shorter than the time taken to complete activation from the power OFF state in FIG. 3B. Power consumption thereof is higher than that in the power OFF state in FIG. 3B, and lower than that in the power saving state in FIG. 3C.

When the power modes in FIGS. 3A through 3D are arranged in the order of higher power consumption, FIGS. 3A through 3D can be arranged in the order of FIG. 3A>FIG. 3C>FIG. 3D>FIG. 3B.

In addition, when the power modes in FIGS. 3B through 3D are arranged in the order of faster transfer time to FIG. 3A, FIGS. 3B through 3D can be arranged in the order of FIG. 3C>FIG. 3D>FIG. 3B.

When a long-press operation of the power button in which the power button is pressed for a predetermined time or longer is executed in the high speed activation stand-by state, the power mode maybe transferred to the power OFF state in FIG. 3B.

<Functions of Apparatus>

Next, functions of the apparatus according to the present exemplary embodiment will be described with reference to FIG. 2.

First, the image forming apparatus 101 includes the following printing function. The CPU 321 receives print data described by page-description language transmitted from the data processing apparatus 102, for example, and stores the print data in the RAM 340.

When the CPU 301 confirms that the CPU 321 has received the print data, the CPU 301 analyzes the page-description language and stores the print data in the RAM 340 as intermediate data that can be converted into bit map data by the image processing processor 324.

When the CPU 321 confirms that the intermediate data has been generated, the CPU 321 inputs the intermediate data read out from the RAM 340 to the image processing processor 324, so that the image processing processor 324 outputs bit map data to the RAM 340 via the CPU 321.

The CPU 321 transmits a print request to the printer engine 205 via the device controller 325 according to the generation of the bit map data, and informs the image processing processor 324 of a position of the image data (bit map data).

According to an image transfer synchronization signal from the printer engine 205, the CPU 321 transmits the image data in the RAM 340 to the printer engine 205 via the image processing processor 324 and the device controller 325.

The printer engine 205 prints the digital image data transferred by the controller 202 on a sheet of paper according to predetermined electro-photographic processing. In addition, the image forming apparatus 101 includes the following additional functions.

<Activation Time Reduction Function>

In an activation time reduction function, the RAM 340 as a main storage memory of the controller 202 is held in a power supply state to hold content of the main storage memory at the power OFF operation, so that the image forming apparatus 101 is brought into a state where the user can operate the image forming apparatus 101 in a short time period when the power is ON next time.

<Sleep Function>

In a case where a job is not executed for a predetermined time or longer, the image forming apparatus 101 is transferred to the power saving state in order to reduce power consumption of the image forming apparatus 101. This predetermined time may be a default value, or may be set by the user.

<Login Function>

In a login function, inputs of a user ID and a password corresponding to an individual user are accepted through the operation unit 201 to accept inputs of various jobs only when user authentication is successful. Security of the apparatus is improved by recording a history of users and executed jobs. The image forming apparatus 101 can change whether to allow these additional functions to be valid through the settings.

The display panel of the operation unit 201 is configured to be capable of displaying various setting screens, so that the user can select valid or invalid of the above additional functions through the various setting screens.

Further, the image forming apparatus 101 includes a function for displaying the following screens on the display panel of the operation unit 201. In a case where the user performs a predetermined operation, these screens are switched as necessary.

<Normal Screen>

A normal screen is displayed on the operation unit 201 at a normal time. When the normal screen is displayed, the image forming apparatus 101 accepts execution instructions of the above-described various jobs through the operation button provided on the operation unit 201. Further, in a case where the image forming apparatus 101 accepts a predetermined operation from the user, the display screen is switched to below-described user mode screens.

<Login Screen>

A login screen is displayed when the above-described login function is set to be valid. When the login screen is displayed, the image forming apparatus 101 accepts inputs of a user ID and a password through the operation button of the operation unit 201. In a case where the user ID and the password input by the user are valid, the display screen of the operation unit 201 is switched to the normal screen.

<User Mode Screen>

A user mode screen is a setting screen which allows a user to change the settings of setting items other than particular setting items for service engineers.

Although, in many cases, the screen is called merely as "setting screen" in general image forming apparatuses, in the present exemplary embodiment, this screen is referred to as "user mode screen" to distinguish the screen from a below-described service mode screen in order to make the description clear. In the user mode screen, valid or invalid of the activation time reduction function and the login function can be set.

<Service Mode Screen>

In a service mode screen, a service engineer can adjust the operation of the image forming apparatus 101 and change settings of particular setting items. In the service mode screen, valid or invalid of a complete-clear function can be set. The user mode screen and the service mode screen are examples of first screens. In addition, the normal screen and the login screen are examples of second screens.

<Operations of Apparatus>

Next, operations of the apparatus according to the present exemplary embodiment will be described with reference to FIGS. 4A through 4E and 5.

The operations illustrated in respective flowcharts are realized when the CPU 301 and the CPU 321 execute the main programs loaded in the RAM 340.

Further, two or more programs controlled by the CPU 301 are stored in the ROM 302 in FIG. 2.

A first program is a basic program 400 for controlling the above-described print function for printing print data, the activation time reduction function, the sleep function, and the login function. The basic program 400 executes overall basic control of the controller 202. A second program is a function addition program 401 for controlling additional functions of the controller 202. The function addition program 401 executes the control of the programs for adding functions.

For example, in addition to controlling installation and uninstallation of the programs for adding functions such as a program for managing the print history and a program for managing an input and an output of print data, the function addition program 401 controls the operation of the additional program.

Further, the additional program can be freely created and installed by the user.

FIGS. 4A through 4E are diagrams illustrating transition of processing time of the image forming apparatus 101 according to the present exemplary embodiment. Hereinbelow, transfer control will be described in detail. In the transfer control, power ON processing for activating a program for storing the data in a volatile memory (RAM 340) or power OFF processing for stopping the program is executed according to start or stop of the power supply.

FIG. 4A is a diagram illustrating processing at the transition time from FIG. 3B to FIG. 3A caused by the power ON operation. According to an initial program of the ROM 302, the CPU 301 reads out the basic program 400 and the function addition program 401 from the ROM 302 to store in the RAM 340.

In FIGS. 4A through 4E, the transfer control includes a first mode for supplying power to the RAM 340 and the network controller 322 and a second mode for supplying power to the RAM 340 while not supplying power to the network controller 322, and the CPU 321 executes the control for transferring the mode from the first mode to the second mode according to a data processing state. The first program is the basic program 400 for executing data processing, and the second program is the function addition program 401 for adding functions to the basic program 400.

The basic program 400 and the function addition program 401 are initialized. Then, the data stored in the non-volatile memory 303 and the hard disk device 203 are read out to store in the RAM 340, so that the respective programs are transferred to operable states. An initialization operation of the basic program 400 is expressed as power ON processing 410 whereas an initialization operation of the function addition program 401 is expressed as power ON processing 411.

Further, an initialization operation of the printer engine 205 is executed in synchronization therewith, so that the printer engine 205 is transferred to a printable state. The initialization operation of the printer engine 205 is expressed as a power ON processing 412.

FIG. 4B is a diagram illustrating processing at the transition time from FIG. 3A to FIG. 3B caused by the power OFF operation.

The data stored in the RAM 340 is saved to the non-volatile memory 303 or the hard disk device 203 before the power supply is stopped, so that the RAM 340 is transferred to a state where the power can be shut off safely.

When the data in the RAM 340 is saved to the non-volatile memory 303 or the hard disk device 203, if an access method of the data is a file system, the CPU 321 completes writing of the entire data and executes the control of closing the file.

An ending operation of the basic program 400 is expressed as a power OFF processing 413 whereas an ending operation of the function addition program 401 is expressed as a power OFF processing 414. Further, an ending operation of the printer engine 205 is executed in synchronization with the above operations, so that the printer engine 205 is transferred to a state where the power supply can be stopped. The ending operation of the printer engine 205 is expressed as a power OFF processing 415.

FIG. 4C is a diagram illustrating processing at the transition time from FIG. 3A to FIG. 3D caused by a high speed activation stand-by operation.

The basic program 400 saves the data stored in the RAM 340 to the non-volatile memory 303 and the hard disk device 203. Thereafter, the basic program 400 causes the controller 202 to transfer to a power saving state. The above control is expressed as a power saving processing 416.

Further, an ending operation of the printer engine 205 is executed in synchronization with the above operations, so that the printer engine 205 is transferred to a state where the power supply can be stopped. The ending operation of the printer engine 205 is expressed as the power OFF processing 415.

In FIG. 4C, although the power saving processing of the basic program 400 is operated, the power saving processing of the function addition program 401 is not operated. Therefore, the power mode becomes a power saving state while the data stored in the RAM 340 is not saved to the non-volatile memory 303 or the hard disk device 203. In this state, if the electric power supply is interrupted or the power code is unplugged, the power supply is stopped and the data stored in the RAM 340 will be lost. As a result, mismatch arises with the data stored in the non-volatile memory 303 or the hard disk device 203, and thus there is a possibility that the function addition program 401 operates incorrectly. The control for solving the above problem, which will be described below, is illustrated in FIG. 4E.

FIG. 4D is a diagram illustrating processing at the transition time from FIG. 3D to FIG. 3A caused by a high speed activation return operation.

The control performed by the basic program 400 to return the state transferred to a power saving state through the power saving processing 416 in FIG. 4C to an operable state is expressed as a power saving return processing 417. Further, an initialization operation of the printer engine 205 is executed in synchronization with the above operation, so that the printer engine 205 is transferred to a printable state. The initialization operation of the printer engine 205 is expressed as the power ON processing 412.

FIG. 4E illustrates processing at the transition time from FIG. 3A to FIG. 3D caused by the high speed activation stand-by operation, and also illustrates the control for preventing an incorrect operation of the function addition program 401.

Through the high speed activation stand-by operation, in a same manner as in FIG. 4C, the basic program 400 saves the data stored in the RAM 340 to the non-volatile memory 303 or the hard disk device 203. Thereafter, the basic program 400 executes the power saving processing 416 for transferring the controller 202 to the power saving state.

In parallel with the power saving processing 416, the power OFF processing 414 of the function addition program 401 is executed. The power OFF processing thereof is similar to the power OFF processing 414 in FIG. 4B.

After the power OFF processing 414 is completed, the power ON processing 411 of the function addition program 401 is executed. The power ON processing thereof is similar to the power ON processing 411 in FIG. 4A. Immediately after the power ON processing, there is no difference between the data stored in the RAM 340 and the data stored in the non-volatile memory 303 or the hard disk device 203.

Therefore, even if the power supply is stopped and the data stored in the RAM 340 is lost due to the interruption of electric power supply or the unplugged power code, there is no possibility for the function addition program 401 to operate incorrectly.

Further, because the function addition program 401 can only include the power ON processing 411 and the power OFF processing 414 and does not have to include the power saving processing, a load of the user for creating the additional program can be reduced.

FIG. 5 is a flowchart illustrating a control method of the image forming apparatus 101 according to the present exemplary embodiment. The control method thereof is an example of data processing corresponding to the operation illustrated in FIG. 4E.

In the processing, the operation of the flowchart is started by pressing the power switch.

In step S500, the function addition program 401 confirms whether setting of the activation time reduction function is set to be valid.

In step S501, in a case where the function addition program 401 determines that the setting of the activation time reduction function is set to be invalid (NO in step S501), the processing proceeds to step S502. In step S502, the function addition program 401 executes the power OFF processing.

In the power OFF processing performed in step S502, the function addition program 401 executes the processing in FIG. 4B, and transfers to the power OFF state in FIG. 3B.

On the other hand, in step S501, in a case where the function addition program 401 determines that the setting of the activation time reduction function is set to be valid (YES in step S501), the processing proceeds to step S503. In step S503, the power OFF processing and the power ON processing of the function addition program 401 are started.

The power OFF processing in step S503 represents the power OFF processing 414 of the function addition program 401 in FIG. 4E, and the power ON processing represents the power ON processing 411 of the function addition program 401 in FIG. 4E.

In parallel with the power OFF processing and the power ON processing of the function addition program 401, the basic program 400 executes processing in step S504 and subsequent steps.

In step S504, the power OFF processing of the printer engine 205, which represents the power OFF processing 415 of the printer engine 205 in FIG. 4E, is executed. In parallel with the power OFF processing 415 of the printer engine 205, the basic program 400 executes processing in step S505 and subsequent steps.

In step S505, in a case where the basic program 400 determines that print data that is being received or has already been received exists, image generation processing is stopped. In step S506, the basic program 400 waits until the image generation processing is stopped.

In step S507, the basic program 400 confirms whether the power OFF processing of the printer engine 205 executed in step S504 has been ended. In step S508, the basic program 400 waits until the power OFF processing thereof is completed.

In step S509, the basic program 400 confirms ending of the power OFF processing and the power ON processing of the function addition program 401. In step S510, the basic program 400 waits until the power OFF processing and the power ON processing thereof are ended.

In step S511, the power mode is transferred to the high speed activation stand-by state in FIG. 3D to end the above-described flow.

Figure 6:
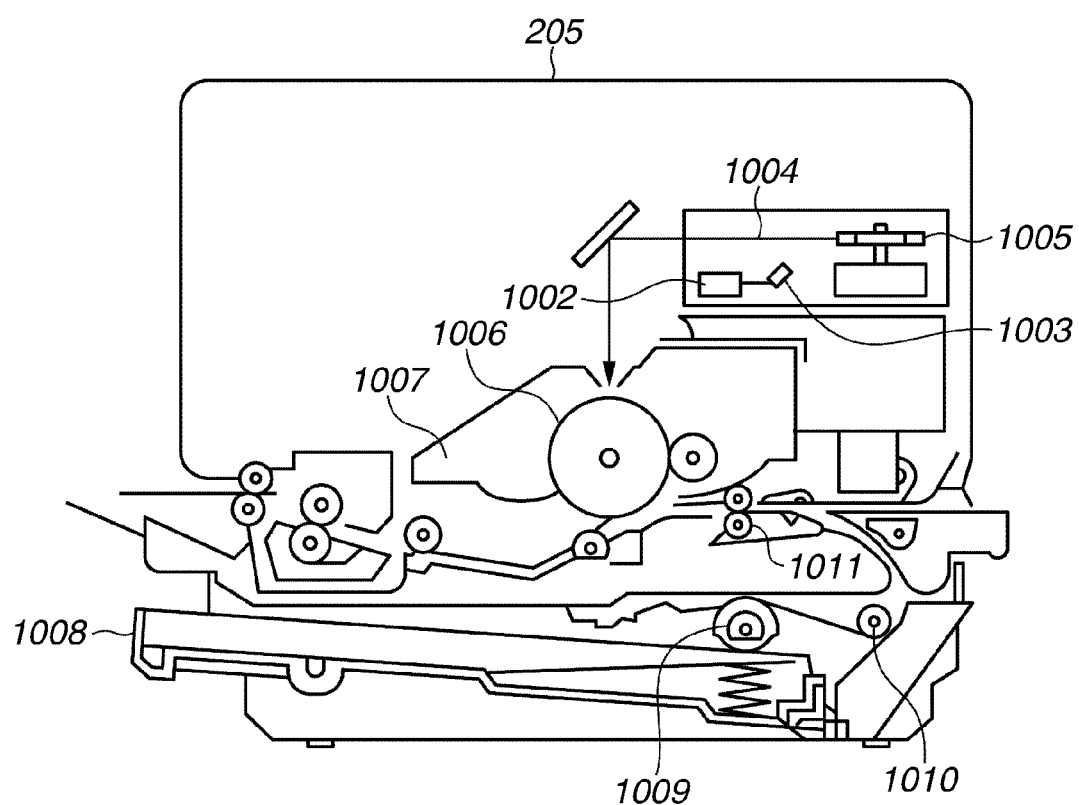
FIG. 6 is a cross-sectional diagram illustrating a configuration of the image forming apparatus.

FIG. 6 is a cross-sectional diagram illustrating a configuration of the image forming apparatus 101 according to the present exemplary embodiment. In FIG. 6, a laser beam print system is exemplified as the printer engine 205 in FIG. 1.

In FIG. 6, print image data is converted into a video signal and output to a laser driver 1002.

The laser driver 1002 is a circuit for driving a semiconductor laser 1003, and switches ON and OFF of a laser beam 1004 emitted from the semiconductor laser 1003 according to the input video signal. The laser beam 1004 is moved in the right-left direction by a rotating polygon mirror 1005, so that an electrostatic drum 1006 is scanned with and exposed to the laser beam 1004.

With this operation, an electrostatic latent image of an output image is formed on the electrostatic drum 1006. This electrostatic latent image is developed by a development unit 1007 provided in a periphery of the electrostatic drum 1006 and transferred to a printing sheet.

The printing sheet is stored in a printing paper cassette 1008 mounted on a main unit of the printer engine 205, conveyed into the apparatus by a paper feed roller 1009 and conveyance rollers 1010 and 1011, and supplied to the electrostatic drum 1006. A printer to which the present exemplary embodiment is applied is not limited to the laser beam printer, and other printers such as an ink jet printer, a dye-sublimation printer, and a silver-halide printer may be employed.

As described above, in a case where the data in the RAM is to be held as it is when the power switch is turned OFF, a purpose of the present exemplary embodiment is to include the additional function of the program capable of recovering the data in the RAM without temporarily saving the data to the non-volatile memory even if the power supply is stopped.

In the first exemplary embodiment, processing for executing the power ON processing 411 subsequent to the power OFF processing 414 of the function addition program 401 in FIG. 4E has been described.

In a second exemplary embodiment, processing for executing only a part of the power ON processing 411 of the function addition program 401 in FIG. 4E while executing remaining processing thereof in the high speed activation return processing in FIG. 4C will be described.

In the present exemplary embodiment, the power ON processing 411 of the function addition program 401 in FIG. 4E is divided into two portions to execute respective portions thereof in the high speed activation stand-by processing and the high speed activation return processing in order to reduce the processing time of the high speed activation stand-by and the high speed activation return.

Figure 7A:
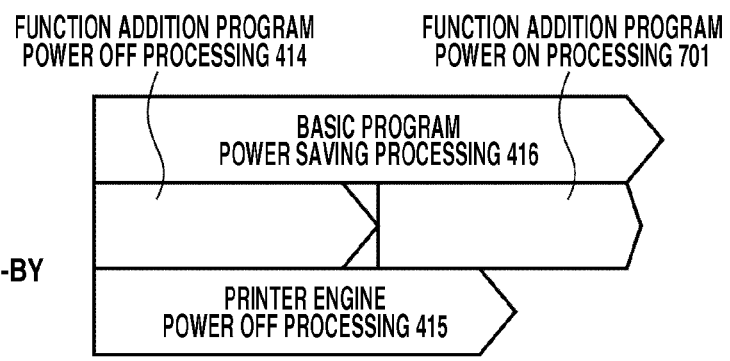
FIGS. 7A and 7B are diagrams illustrating transition of processing time of the image forming apparatus according to an exemplary embodiment.
Figure 7B:
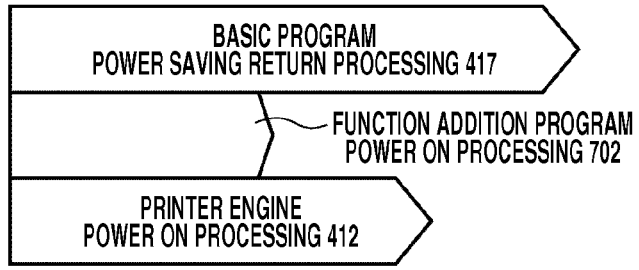

FIGS. 7A and 7B are diagrams illustrating transition of processing time of the image forming apparatus 101 according to the present exemplary embodiment.

In FIGS. 7A and 7B, the power ON processing of the function addition program 401 is divided into two portions of a power ON processing 701 and a power ON processing 702, and the power ON processing 701 is executed in FIG. 7A while the power ON processing 702 is executed in FIG. 7B.

In the high speed activation return in FIG. 7B, the power ON processing 412 of the printer engine 205 takes a long time so that the power ON processing 702 is executed within that wait time. This processing is advantageous in that the total processing time of FIG. 7A can be reduced while the total processing time of FIG. 7B remains unchanged.

In the present exemplary embodiment, the power ON processing 701 is targeted at a program for executing management and installation control of an additional program, serving as a part of a platform in the function addition program 401. On the other hand, the power ON processing 702 is targeted at a program to be added, so as to cause the program to be separable easily.

As described above, the power ON processing of the function addition program 401 is divided into two portions to be executed in the high speed activation stand-by processing and the high-speed activation return processing. With this operation, the processing time of the high speed activation stand-by and the high speed activation return can be reduced. Further, by making use of existing activation processing and power cutting processing, programming for temporarily saving the data in the RAM to the non-volatile memory is not necessary for the function addition program 401.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-173723 filed Aug. 6, 2012, which is hereby incorporated by reference herein in its entirety.

What is claimed is:

1. An information processing apparatus having a platform for executing a specific application, the information processing apparatus comprising:
   a transfer unit configured to shift a power state of the information processing apparatus to a power off state, a power on state, or a power saving state in which power consumption is lower than power consumption in the power on state and higher than power consumption in the power off state; and
   a control unit configured to:
   (a) when the power state is shifted from the power on state to the power off state, execute first power OFF processing to end the specific application, in which data, relating to the specific application being stored in a volatile memory is written in a non-volatile memory, and execute a second power OFF processing to end an initial application of which type is different from a type of the specific application,
   (b) when the power state is shifted from the power off state to the power on state, execute first power ON processing to start the specific application in which data, relating to the specific application, stored in the non-volatile memory is written in the volatile memory, and execute a second power ON processing to start the initial application, and
   (c) when the power state is shifted from the power on state to the power saving state, execute the first power OFF processing to end the specific application and then execute the first power ON processing to start the specific application, and execute power saving processing in which data, relating to the initial application, stored in a volatile memory is written in a non-volatile memory, and
   wherein the control unit does not execute the second power OFF processing and the second power ON processing when the power state is shifted from the power on state to the power saving state.

2. The information processing apparatus according to claim 1,
   wherein the non-volatile memory is a hard disk.

3. The information processing apparatus according to claim 1,
   wherein the initial application is a basic program for executing data processing.

4. The information processing apparatus according to claim 1,
   wherein the specific application is a program for adding a function to the basic program.

5. The information processing apparatus according to claim 1,
   wherein the information processing apparatus includes a printing apparatus, a facsimile apparatus, a copying apparatus, or a multi-function image processing apparatus.

6. A control method for an information processing apparatus having a platform for executing a specific application, the control method comprising:
- shifting a power state of the information processing apparatus to a power off state, a power on state, or a power saving state in which power consumption is lower than power consumption in the power on state and higher than power consumption in the power off state; and
- controlling to:
  - (a) when the power state is shifted from the power on state to the power off state, execute first power OFF processing to end the specific application, in which data, relating to the specific application being stored in a volatile memory is written in a non-volatile memory, and execute a second power OFF processing to end an initial application of which type is different from a type of the specific application,
  - (b) when the power state is shifted from the power off state to the power on state, execute first power ON processing to start the specific application in which data, relating to the specific application, stored in the non-volatile memory is written in the volatile memory, and execute a second power ON processing to start the initial application, and
  - (c) when the power state is shifted from the power on state to the power saving state, execute the first power OFF processing to end the specific application and then execute the first power ON processing to start the specific application, and execute power saving processing in which data, relating to the initial application, stored in a volatile memory is written in a non-volatile memory, and
- wherein the control unit does not execute the second power OFF processing and the second power ON processing when the power state is shifted from the power on state to the power saving state.

7. A non-transitory computer-readable storage medium storing a specific application for causing a computer to execute a control method for an information processing apparatus, the control method comprising:
- shifting a power state of the information processing apparatus to a power off state, a power on state, or a power saving state in which power consumption is lower than power consumption in the power on state and higher than power consumption in the power off state; and
- controlling to:
  - (a) when the power state is shifted from the power on state to the power off state, execute first power OFF processing to end the specific application, in which data, relating to the specific application being stored in a volatile memory is written in a non-volatile memory, and execute a second power OFF processing to end an initial application of which type is different from a type of the specific application,
  - (b) when the power state is shifted from the power off state to the power on state, execute first power ON processing to start the specific application in which data, relating to the specific application, stored in the non-volatile memory is written in the volatile memory, and execute a second power ON processing to start the initial application, and
  - (c) when the power state is shifted from the power on state to the power saving state, execute the first power OFF processing to end the specific application and then execute the first power ON processing to start the specific application, and execute power saving processing in which data, relating to the initial application, stored in a volatile memory is written in a non-volatile memory, and
- wherein the control unit does not execute the second power OFF processing and the second power ON processing when the power state is shifted from the power on state to the power saving state.

8. The information processing apparatus according to claim 1, wherein the platform is a platform for executing a JAVA program application.

9. The information processing apparatus according to claim 1, wherein power is supplied to the volatile memory, and power supply to the non-volatile memory is stopped in the power saving state after the first power ON processing.

10. The information processing apparatus according to claim 1, wherein the specific application is a function addition program for controlling additional functions.

11. The information processing apparatus according to claim 1, further comprising:
- a power switch configured to receive an offer instruction to turn off the information processing apparatus; and
- a storage unit configured to store information indicating an activation mode of the information processing apparatus,
- wherein the control unit shifts the power state of the information processing apparatus to the power saving state if the storage unit stores the information, and the control unit shifts the power state of the information processing apparatus to the power off state if the storage unit does not store the information.

* * * * *